US010140730B2

(12) United States Patent
Ding

(10) Patent No.: US 10,140,730 B2
(45) Date of Patent: Nov. 27, 2018

(54) DISPLAY CONTROL METHODS AND APPARATUSES

(71) Applicant: Beijing Zhigu Rui Tuo Tech Co., Ltd, Beijing (CN)

(72) Inventor: Dayong Ding, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 26 days.

(21) Appl. No.: 15/197,664

(22) Filed: Jun. 29, 2016

(65) Prior Publication Data

US 2017/0004605 A1 Jan. 5, 2017

(30) Foreign Application Priority Data

Jun. 30, 2015 (CN) .......................... 2015 1 0385696

(51) Int. Cl.
*G09G 5/00* (2006.01)
*G06T 11/00* (2006.01)
*G06T 7/33* (2017.01)

(52) U.S. Cl.
CPC ............... *G06T 11/00* (2013.01); *G06T 7/33* (2017.01); *G06T 2207/30244* (2013.01)

(58) Field of Classification Search
CPC .... G06T 7/33–7/337; G06T 7/70–7/74; G06T 2207/30244
See application file for complete search history.

(56) References Cited

U.S. PATENT DOCUMENTS

| | | |
|---|---|---|
| 6,332,046 B1 | 12/2001 | Fujimoto et al. |
| 6,367,933 B1 | 4/2002 | Chen et al. |
| 7,347,564 B2 | 3/2008 | Matsumoto et al. |
| 8,194,101 B1 | 6/2012 | Mann et al. |
| 8,439,257 B2 | 5/2013 | Beals et al. |
| 8,668,137 B2 | 3/2014 | Herzig |
| 9,749,619 B2 | 8/2017 | Mann et al. |

(Continued)

FOREIGN PATENT DOCUMENTS

| | | |
|---|---|---|
| CN | 101483719 A | 7/2009 |
| CN | 101893934 A | 11/2010 |

(Continued)

OTHER PUBLICATIONS

Office Action dated Oct. 26, 2017 for U.S. Appl. No. 15/197,631, 26 pages.

(Continued)

*Primary Examiner* — Charles Tseng
(74) *Attorney, Agent, or Firm* — Amin, Turocy & Watson, LLP

(57) ABSTRACT

Various display control methods and apparatuses are provided. A method comprises acquiring planar mapping relationship information between an imaging plane and a display plane, and deform-displaying the display content on the display plane at least according to the planar mapping relationship information, to reduce a deformation degree of an image formed by the deformed display content on the imaging plane. A requirement for alignment precision of an imaging device required by the imaging plane is reduced to acquire an image of the display content deformed less to some extent, and users' operational convenience is increased.

39 Claims, 7 Drawing Sheets

(56) References Cited

U.S. PATENT DOCUMENTS

| | | |
|---|---|---|
| 2005/0094108 A1 | 5/2005 | Kobayashi |
| 2005/0214662 A1 | 9/2005 | Kobayashi et al. |
| 2005/0242189 A1* | 11/2005 | Rohs ................ H04M 1/72522 235/462.46 |
| 2006/0290896 A1 | 12/2006 | Nishida |
| 2009/0180004 A1* | 7/2009 | Shioda ............... H04N 5/23219 348/231.2 |
| 2009/0190838 A1 | 7/2009 | Albrecht et al. |
| 2011/0178708 A1* | 7/2011 | Zhang ................. G01C 21/165 701/501 |
| 2013/0022231 A1 | 1/2013 | Nepomniachtchi et al. |
| 2016/0055671 A1 | 2/2016 | Menozzi et al. |

FOREIGN PATENT DOCUMENTS

| | | | |
|---|---|---|---|
| CN | 102681755 | A | 9/2012 |
| CN | 102681775 | A | 9/2012 |
| CN | 103365481 | A | 10/2013 |
| CN | 103366659 | A | 10/2013 |
| CN | 103869963 | A | 6/2014 |
| CN | 104267816 | A | 1/2015 |
| CN | 104519347 | A | 4/2015 |
| CN | 104766315 | A | 7/2015 |
| CN | 104978009 | A | 10/2015 |

OTHER PUBLICATIONS

Chinese Office Action dated May 3, 2018 for U.S. Patent Application No. 201510385654.5, 7 pages.

Chinese Office Action dated Jun. 26, 2018 for Chinese Patent Application No. 201510385696.9, 14 pages (with translation).

\* cited by examiner

DISPLAY CONTROL METHODS AND APPARATUSES

RELATED APPLICATION

The present application claims the benefit of priority to Chinese Patent Application No. 201510385696.9, filed on Jun. 30, 2015, and entitled "Display Control Methods and Apparatuses", which application is hereby incorporated into the present application by reference herein in its entirety.

TECHNICAL FIELD

The present application relates to the field of display technologies, and, for example, to various display control methods and apparatuses.

BACKGROUND

With continuous development of science and technology, for example, two-dimension code and other information, payment carriers are continually enhanced, the carriers can carry rich content and information in simple forms, facilitating users to scan the code in a simple way, applications thereof are increasingly popular and extensive, for example, it is possible to display two-dimension code on a certain display plane in scenarios such as shopping, payment, anti-counterfeiting and interaction, it is possible to start a certain code scanning software, to align a lens (e.g., a camera of a mobile phone or the like) with the two-dimension code to obtain an image of the two-dimension code, and related content and information carried in the two-dimension code can be obtained by decoding the image of the two-dimension code acquired by the lens through the code scanning software.

SUMMARY

A brief summary about the present application is given hereinafter, so as to provide a basic understanding about certain aspects of the present application. It should be understood that the summary is not an exhaustive summary about the present application. It is neither intended to determine critical or important parts of the present application, nor intended to limit the scope of the present application. Its purpose is merely giving some concepts in a simplified form, to be taken as the preamble to be described later in more detail.

One or more example embodiments of the present application provide various display control methods and apparatuses.

In a first aspect, an example embodiment of the present application provides a display control method, comprising:

acquiring planar mapping relationship information between an imaging plane and a display plane; and deform-displaying the display content on the display plane at least according to the planar mapping relationship information, to reduce a deformation degree of an image formed by the deformed display content on the imaging plane.

In a second aspect, an example embodiment of the present application provides a display control apparatus, comprising:

a planar mapping relationship information acquisition module, configured to acquire planar mapping relationship information between an imaging plane and a display plane; and a deform-display control module, configured to deform-display the display content on the display plane at least according to the planar mapping relationship information, to reduce a deformation degree of an image formed by the deformed display content on the imaging plane.

In a third aspect, an example embodiment of the present application further provides a display control apparatus, comprising:

a processor, a communication interface, a memory and a communication bus; the processor, the communication interface and the memory accomplishing mutual communication through the communication bus;

the memory being configured to store at least one instruction; the instruction causing the processor to perform the following operations:

acquiring planar mapping relationship information between an imaging plane and a display plane; and deform-displaying the display content on the display plane at least according to the planar mapping relationship information, to reduce a deformation degree of an image formed by the deformed display content on the imaging plane.

In the example embodiments of the present application, it is feasible to acquire planar mapping relationship information between an imaging plane and a display plane, and deform-display the display content on the display plane at least according to the planar mapping relationship information, to reduce a deformation degree of an image formed by the deformed display content on the imaging plane; such processing is equivalent to adaptively adjusting a display parameter such as a display shape of the display content on the display plane according to the planar mapping relationship information between the imaging plane and the display plane, to, in a manner similar to pre-deforming the display content on the display plane, partially cancel and even avoid the deformation degree of the image of the display content acquired on the imaging plane, causing the image of the display content acquired on the imaging plane to have little deformation and even no deformation, which reduces the requirement for alignment precision of an imaging device required by the imaging plane to acquire an image of the display content deformed less to some extent, simplifies and even avoids complicated operations such as aligning the imaging device of the display content and adjusting posture during shooting, and increases users' operational convenience; in addition, through pre-deformation of the display plane, the imaging device can make full use of pixel resources of the imaging plane to acquire more information of the display content by means of optical acquisition, for example, an image of the display content which has a relatively uniform signal to noise ratio and higher quality is obtained, thus helping to increase correctness and success rate at which the imaging device processes, which comprises, but is not limited to, decoding, synthesis and transmission of the image.

These and other aspects of the present application will be more evident through the following detailed description about optional embodiments of the present application with reference to the accompanying drawings.

BRIEF DESCRIPTION OF THE DRAWINGS

The present application can be better understood with reference to the description given below in combination with the accompanying drawings, in which the same or similar reference signs are used in all the drawings to indicate the same or similar components. The drawings together with the following detailed description are comprised in the specification and form a part of the specification, and are configured to further exemplify alternative embodiments of the present application and explain the principle and advantages of the present application. In the drawings.

Figure 1:
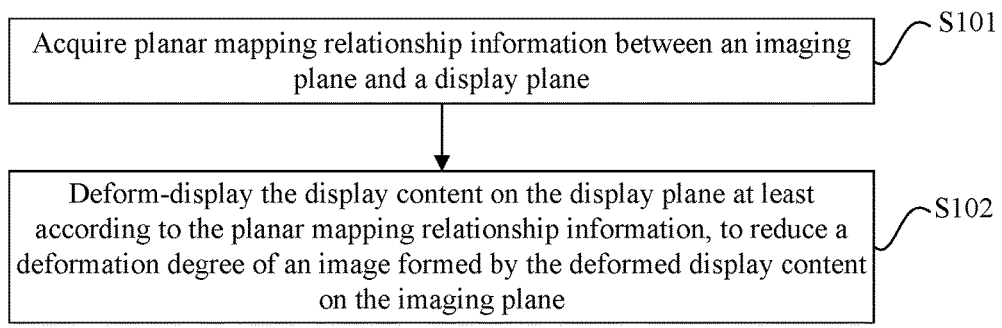
FIG. 1 is a flowchart of a display control method according to an example embodiment of the present application.

Persons skilled in the art should understand that components in the accompanying drawings are shown merely for simplicity and clearness, and are not always drawn to scale. For example, sizes of some components in the accompanying drawings may be amplified relative to other components, so as to facilitate enhancing the understanding of embodiments of the present application.

DETAILED DESCRIPTION

Example embodiments of the present application are described below in detail with reference to the accompanying drawings. For the sake of clarity and simplicity, not all the features of implementations are described in the specification. However, it should be understood that, lots of decisions specific to implementations must be made during development of any such actual embodiment, so as to achieve specific goals of developers, for example, restrictions relevant to systems and services are met, and the restrictions may vary with different implementations. In addition, it should also be understood that, although development work is likely to be very complicated and time-consuming, for those skilled in the art who benefit from the disclosure, the development work is merely a routine task.

Herein, it should also be noted that, in order to avoid blurring the present application due to unnecessary details, only apparatus structures and/or processing steps closely related to solutions according to the present application are described in the accompanying drawings and the specification, but representation and description about members and processing having little to do with the present application and known to those of ordinary skill in the art are omitted.

Example embodiments of the present application are further described below in detail with reference to the accompanying drawings (in which like elements are denoted by like reference numerals) and embodiments. The following embodiments are used for describing the present application, but are not intended to limit the scope of the present application.

A person skilled in the art may understand that the terms such as "first" and "second" in the present application are used only to differentiate different steps, devices, modules, or the like, and neither represent any specific technical meaning, nor indicate any necessary logical relationship between the terms.

FIG. 1 is a flowchart of a display control method according to an embodiment of the present application. An execution body of the display control method according to the embodiment of the present application may be a certain display control apparatus, and the display control apparatus may perform content display control by executing the display control method during applications, which comprise, but are not limited to, content display and video playback. Device manifestations of the display control apparatus are not limited, for example, the display control apparatus may be a certain separate component, and the component cooperates with a display device with a display screen or a display device that can form a certain display plane in space for communications; or the display control apparatus may be integrated, as a certain functional module, into a display device with a display screen or a display device that can form a certain display plane in space. Specifically, as shown in FIG. 1, a display control method according to an embodiment of the present application comprises:

S101: Acquire planar mapping relationship information between an imaging plane and a display plane.

S102: Deform-display the display content on the display plane at least according to the planar mapping relationship information, to reduce a deformation degree of an image formed by the deformed display content on the imaging plane.

In the process of practicing the embodiments of the present application, the inventor of the present application has found that, if a certain display content displayed by a display plane is shot, in the traditional method, when a user shoots the display content through an imaging device such as a mobile phone, it is generally necessary to align the display content for shooting, to acquire an image of the display content deformed less. By taking that the display content is a two-dimensional code as an example, when the user shoots a two-dimensional code displayed on a certain display plane through a mobile phone, it is generally necessary to adjust a shooting posture of the mobile phone, thus adjusting the degree to which the camera of the mobile phone is aligned with the two-dimensional code, causing that an image of the two-dimensional code undeformed or deformed less is obtained on the imaging plane of the mobile phone for a code scanning software to perform decoding correctly; the traditional method has certain requirements for the shooting posture of the imaging device such as a mobile phone, avoiding that the obtained image of the two-dimensional code is deformed excessively due to insufficient alignment or excessive deviation to lead to incorrect decoding, which thus causes operational inconvenience to the user to some extent.

To this end, the embodiment of the present application can acquire planar mapping relationship information between an imaging plane and a display plane, and deform-display the display content on the display plane at least according to the planar mapping relationship information, to reduce a deformation degree of an image formed by the deformed display content on the imaging plane; such processing is equivalent to adaptively adjusting a display parameter such as a display shape of the display content on the display plane according to the planar mapping relationship information between the imaging plane and the display plane, to, in a manner similar to pre-deforming the display content on the display plane, partially cancel and even avoid the deformation degree of the image of the display content acquired on the imaging plane, causing the image of the display content acquired on the imaging plane to have little deformation and even no deformation, which reduces the requirement for alignment precision of an imaging device required by the imaging plane to acquire an image of the display content deformed less to some extent, simplifies and even avoids complicated operations such as aligning the imaging device of the display content and adjusting posture during shooting, and increases users' operational convenience; in addition, through pre-deformation of the display plane, the imaging device can make full use of pixel resources of the imaging plane to acquire more information of the display content by means of optical acquisition, for example, an image of the display content which has a relatively uniform signal to noise ratio and higher quality is obtained, thus helping to increase correctness and success rate at which the imaging device processes, which comprises, but is not limited to, decodes, synthesizes and transmits the image.

Specifically, in the technical solution according to the embodiment of the present application, the display plane is a plane where a source content is displayed through light. In different display technologies, specific manifestations of the display plane vary, for example, the source content, via light of a display device, may be imaged on a certain display screen, imaged on a certain plane before or after the display screen, or projected on a certain plane in space, and correspondingly, the display screen, the plane before or after the display screen, or the plane in space is the display plane in the embodiment of the present application. A certain source content is generally displayed as a certain display content on the display plane through multiple points of the display plane.

The imaging plane is a surface where a certain device having an imaging function (i.e., imaging device) performs imaging, for example, the imaging plane may be an image sensing unit or an image sensing unit array or the like, related light of a certain display content displayed on the display plane is transmitted to the imaging plane of the imaging device for imaging via an optical element of the imaging device, and thus an image of the display content is obtained on the imaging plane.

The planar mapping relationship information between the imaging plane and the display plane reflects a spatial corresponding relationship between multiple points in the imaging plane and multiple points in the display plane, for example, a spatial corresponding relationship between multiple points in the display plane and image points corresponding to the points in the imaging plane and the like.

Different planar mapping relationship information reflects that spatial positions of image points corresponding to the points on the display plane on the imaging plane vary, and in the case that the display content is presented through multiple points on the display plane, it is likely to result in that the display shape of the display content on the display plane and the shape of the image of the display content on the imaging plane change (that is, deform). Therefore, it is possible to determine a deform-display control parameter of the display content at least according to the planar mapping relationship information and deform-display the display content on the display plane according to the deform-display control parameter, to partially cancel and even avoid the deformation degree of the image of the display content on the imaging plane through pre-deformed display of the display plane.

Whether the display content is deformed may be relative to a certain reference shape of the display content. Optionally, it is feasible to use the shape of the display content as a reference before the display content is deform-display controlled on the display plane, if, relative to the reference shape, the display content changes wholly or partially in the shape, it is equivalent to deform-display control the display content, possible manifestations are as follows: for example, relative to the reference shape, the display content deform-displayed on the display plane is, but not limited to, at least partially drawn, at least partially flattened, at least partially zoomed out, at least partially tilted and/or at least partially distorted, which thus meets diversified application demands of reducing the deformation degree of the image of the display content acquired in the case that the imaging plane and the display plane are in multiple planar mapping relationships, and increases universality of the solution.

Figure 2A:
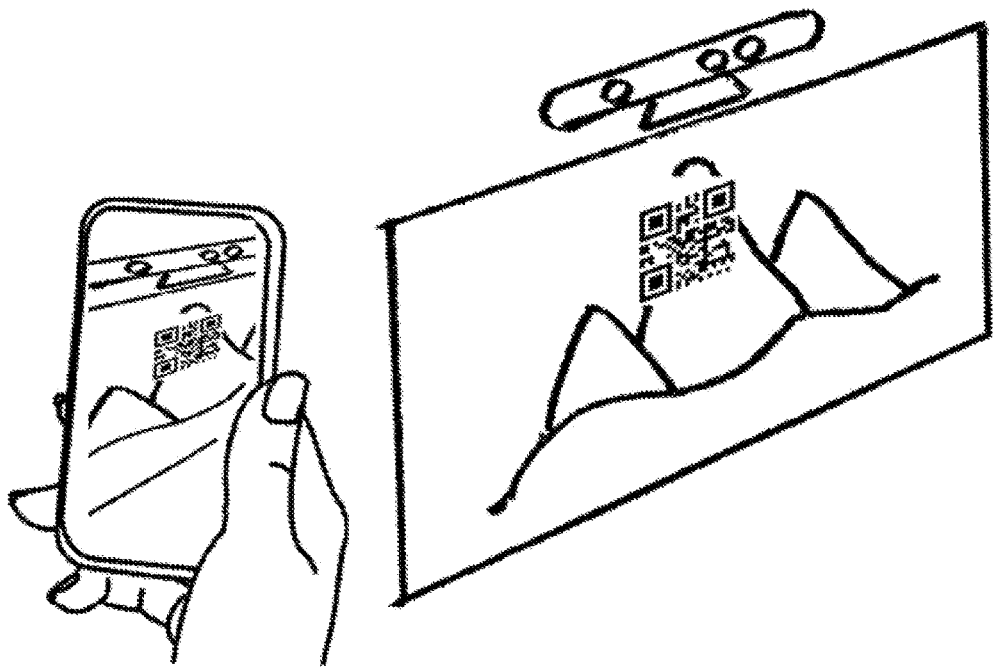
FIG. 2a illustrates an example where two-dimensional code is in a state before deform-display adjustment in an application scenario according to an example embodiment of the present application.
Figure 2B:
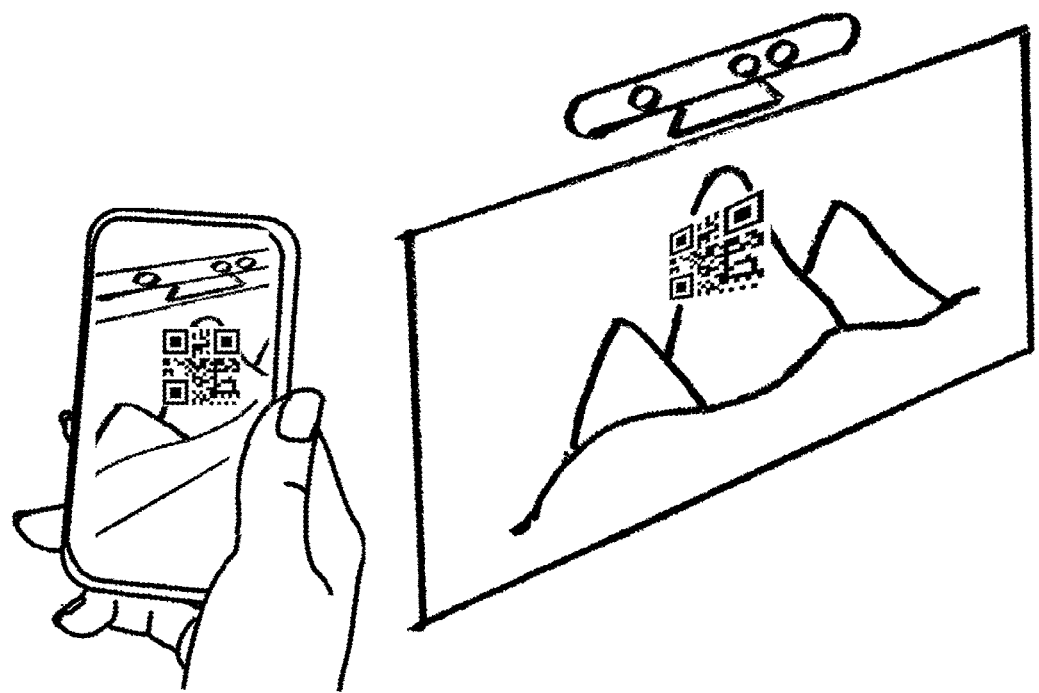
FIG. 2b illustrates an example where two-dimensional code is in a state after deform-display adjustment in an application scenario according to an example embodiment of the present application.

An optional application scenario of code scanning of a two-dimensional code is taken as an example for description. The shape of the two-dimensional code displayed on the display plane is square and undeformed, the two-dimensional code is scanned when the mobile phone is in the state as shown in FIG. 2a, the two-dimensional code obtained on the imaging plane of the mobile phone deforms to some extent, and the deformation degree may affect normal decoding of the code scanning software, and even result in that normal decoding cannot be performed; in this case, it is possible to use any optional aspect according to example embodiments of the present application to pre-deform the two-dimensional code displayed on the display plane, as shown in FIG. 2b; in this way, the mobile phone does not need to change a current position and/or posture or the like, the deformation degree of the image of the two-dimensional code that can be obtained on the imaging plane of the mobile phone is reduced relative to that shown in FIG. 2a, and an image of the two-dimensional code undeformed can be obtained, thus facilitating the code scanning software of the mobile phone to decode the image and increasing the success rate of normal decoding. It can be understood that the two-dimensional code displayed on the display plane is merely an optional form of the display content displayed on the display plane according to the embodiment of the present application, and the display content may also be any form other than the two-dimensional code, for example, a certain advertisement content, encrypted pattern, anti-fake picture or visible light communication (VLC) carrier and so on, which are not repeated hereinafter.

In the technical solution according to the embodiment of the present application, the planar mapping relationship information between the imaging plane and the display plane is manifested and acquired very flexibly, which is not limited in the embodiment of the present application.

In an example embodiment, the planar mapping relationship information between the imaging plane and the display plane is acquired in the following manner: determining the planar mapping relationship information according to multi-point position information of the display plane, multi-point position information of the imaging plane and posture information of the imaging plane. The planar mapping relationship information between the imaging plane and the display plane is determined by using the solution, the display content is deform-display controlled on the display plane accordingly, and it is possible to obtain an image of the display content deformed less and even undeformed on the imaging plane. Specifically, projection mapping between the imaging plane and the display plane in a three-dimensional space is planar homography between the imaging plane and the display plane, and the planar homography reflects a planar mapping relationship between the imaging plane and the display plane, that is to say, points on the display plane and corresponding points on the imaging plane meet a planar homography relationship, that is:

$$x = Wx' \quad (1)$$

In the above formula, x' denotes a point on the display content (before deformed adjustment) displayed on the display plane; x denotes a corresponding point of an image of the display content (before deformed adjustment) displayed on the imaging plane; W denotes a planar homography relationship matrix, which reflects planar mapping relationship information between the display plane and the imaging plane.

During an actual application, it is possible to estimate the planar homography relationship matrix W according to position information of multiple points of the display plane in space, position information of multiple points of the imaging plane in space and posture information of the imaging plane. Therefore, in order to obtain an image of the display content deformed less without changing the planar homography relationship (e.g., it is not necessary to make adjustment on shooting position, shooting posture and the like) between the display plane and the imaging plane, it is possible to inversely transform the planar homography relationship matrix W, to obtain an inverse matrix $W^{-1}$ of the planar homography relationship matrix, from which the following formula can be obtained:

$$x'' = W^{-1}x' \quad (2)$$

In the formula, x" denotes a corresponding point of the display content of the display plane corresponding to the image of the display content deformed less and even undeformed obtained on the imaging plane. It is possible to adjust display of the display content on the display plane according to x", for example, display of the display content on the display plane is adjusted from x' to x", and in combination with the formulas (1) and (2), it can be derived that the image W x" obtained on the imaging plane meets:

$$Wx'' = WW^{-1}x' = x' \quad (3)$$

Thus, the image W x" obtained on the imaging plane is equivalent to the display content before deformed adjustment, that is, an undeformed image of the display content.

Further optionally, the determining the planar mapping relationship information according to multi-point position information of the display plane, multi-point position information of the imaging plane and posture information of the imaging plane comprises: determining first mapping relationship information of multiple points of the display plane relative to a reference coordinate system respectively according to the multi-point position information of the display plane; determining second mapping relationship information of multiple points of the display plane relative to the reference coordinate system respectively according to the multi-point position information and the posture information of the display plane; and determining the planar mapping relationship information according to the first mapping relationship information and the second mapping relationship information. The planar mapping relationship information between the imaging plane and the display plane is determined by using the solution, the display content is deform-display controlled on the display plane accordingly, and it is possible to obtain an image of the display content deformed less and even undeformed on the imaging plane; in addition, an example embodiment of determining the planar mapping relationship information by using the solution is very flexible, for example, determination of the first mapping relationship information is related to multi-point position information of the display plane, determination of the second mapping relationship information is related to multi-point position information of the imaging plane and the posture of the imaging plane, and for different imaging planes, it is possible to multiplex the first mapping relationship information to determine planar mapping relationship information respectively corresponding to each imaging plane, thus reducing the calculation amount and implementation complexity of determining planar mapping relationship information between different imaging planes and the same display plane.

The planar homography relationship matrix W that reflects the planar mapping relationship information between the imaging plane and the display plane can be estimated according to position information of multiple points of the display plane in space, position information of multiple points of the imaging plane in space and posture information of the imaging plane, the embodiment of the present application does not limit the specific determination manner and the manifestation of the matrix, and optional solutions and derivation processes thereof are, for example, The world coordinate system is used as a reference coordinate system. The point of the display plane in the display coordinate system is x', a spatial homogeneous coordinate thereof in the world coordinate system is X, and they meet:

$$X = P_1 x' \quad (4)$$

The point of the display plane whose spatial homogeneous coordinate in the world coordinate system is X and the point x of the imaging plane in an imaging plane coordinate system meet:

$$x = P_2 X \quad (5)$$

In combination with the formulas (4) and (5), the following formula can be obtained:

$$x = P_2 P_1 x' \quad (6)$$

that is, $$W = P_2 P_1 \quad (7)$$

wherein; $P_1$ denotes a mapping relationship between the display coordinate system and the world coordinate system of the display plane, that is, first mapping relationship information, configured to map points on the display plane onto the world coordinate system, optionally, it is feasible to determine spatial homogeneous coordinates of the origin of the display coordinate system, a unit reference point on the horizontal axis and a unit reference point on the vertical axis in the world coordinate system, respectively denoted as O, $R_W$, $R_H$, and their spatial homogeneous coordinates in the world coordinate system are respectively: $(O_x, O_y, O_z, 1)^T$, $(R_{Wx}, R_{Wy}, R_{Wz}, 1)^T$, $(R_{Hx}, R_{Hy}, R_{Hz}, 1)^T$; (then, $$P_1 = \begin{bmatrix} R_{Hx} - O_x & R_{Wx} - O_x & O_x \\ R_{Hy} - O_y & R_{Wy} - O_y & O_y \\ R_{Hz} - O_z & R_{Wz} - O_z & O_z \\ 0 & 0 & 1 \end{bmatrix} \quad (8)$$

$P_2$ denotes a mapping relationship between the world coordinate system and an imaging coordinate system of the imaging plane, that is, the second mapping relationship information, configured to map points of spatial homogeneous coordinates of the world coordinate system into the imaging coordinate system of the imaging plane, and the process may be regarded as a standard camera model, that is, $$P_2 = KR[I|-C] \qquad (9)$$

wherein: K denotes an intrinsic parameter of the imaging device, and the intrinsic parameter may comprise, but not limited to, the focal length of the imaging device, position information of a photosensitive element such as an imaging plane and the like; R denotes posture information of the imaging plane, and the posture information may be denoted through, but not limited to, the normal of the imaging plane or different angles between an optical axis of the imaging device and three coordinate axes of a spatial coordinate system. Optionally, if the origin of the world coordinate system is selected to coincide with the optic center of the imaging plane, C=0; two axes x-y of the world coordinate system are parallel to and in the same direction with the two axes of the imaging coordinate system, the axis z and the axes x-y meet a right-hand relationship, R=I (which is a unit matrix), and at this point, $P_2$ is simplified as: $P_2=[K|0]$.

In combination with the formulas (7), (8) and (9), the planar homography relationship matrix W can be obtained. When the planar homography relationship matrix W corresponding to a respective different imaging plane is determined by using the solution, it is possible to multiplex the first mapping relationship information $P_1$, that is to say, the first mapping relationship information determined according to multi-point position information of the display plane is unchanged and does not need to be determined repeatedly, and it is possible to obtain the planar homography relationship matrix W of each imaging plane and the display plane only according to the second mapping relationship information of each different imaging plane, thus reducing the calculation amount and implementation complexity of determining planar mapping relationship information between different imaging planes and the same display plane.

Further optionally, before the planar mapping relationship information is determined, the method may further comprise: acquiring the multi-point position information and the posture information of the imaging plane. After the display control apparatus acquires the multi-point position information and the posture information of the imaging plane, the second mapping relationship information can be determined accordingly at the side of the display control apparatus. The multi-point position information and the posture information of the imaging plane are acquired in a very flexible manner, which is not limited in the embodiment of the present application.

For example, the imaging control apparatus may position and detect a posture of an imaging device comprising the imaging plane, to acquire the multi-point position information and the posture information of the imaging plane. The solution can, by positioning and actively detecting the posture of the imaging device through the display control apparatus, acquire the multi-point position information of the imaging plane and the posture information of the imaging plane, and during acquisition of the information, the display control apparatus can acquire the information in the case of having as little interaction as possible and even having no interaction with the imaging device.

For another example, the imaging control apparatus may receive the multi-point position information and the posture information of the imaging plane from an imaging device comprising the imaging plane. In the solution, the display control apparatus can acquire the multi-point position information of the imaging plane and the posture information of the imaging plane in a manner of receiving them from an imaging device.

In another example embodiment, the manner of acquiring the planar mapping relationship information between the imaging plane and the display plane comprises: acquiring a reference content of the display plane and mapping relationship information of multiple pairs of corresponding points between images of the reference content formed on the imaging plane; and determining the planar mapping relationship information according to the mapping relationship information. A manifestation of the planar mapping relationship information determined based on the solution can be determined according to actual needs, which is not limited in the embodiment of the present application; optionally, it is possible to use a matrix H to describe two-dimensional projection transformation from a display coordinate system of the display plane to an imaging coordinate system of the imaging plane, and in a homogeneous coordinate system, the two-dimensional projection transformation matrix H may be denoted as a 3×3 matrix:

$$H = \begin{bmatrix} h_1 & h_2 & h_3 \\ h_4 & h_5 & h_6 \\ h_7 & h_8 & h_9 \end{bmatrix} \qquad (10)$$

As in the homogeneous coordinate system, the scale is arbitrary, actually the two-dimensional projection transformation matrix H only has 3×3−1=8 degrees of freedom; in general, each pair of corresponding points provide constraints of two degrees of freedom, and thus it is possible to determine the two-dimensional projection transformation matrix H according to four pairs of corresponding points; definitely, during an actual application, to obtain a stable result, it is possible to determine the two-dimensional projection transformation matrix H according to more than four pairs of corresponding points.

It is set that $X_i \leftrightarrow X_i'$ is any pair of corresponding points associated with H, that is, $X_i'=HX_i$; therefore, according to the relation $X_i' \times HX_i = 0$ between two points, the following formula can be obtained:

$$\begin{bmatrix} 0^T & -w_i'x_i^T & y_i'x_i^T \\ w_i'x_i^T & 0^T & -x_i'x_i^T \\ -y_i'x_i^T & x_i'x_i^T & 0^T \end{bmatrix} \begin{pmatrix} h^1 \\ h^2 \\ h^3 \end{pmatrix} = 0 \qquad (11)$$

wherein: $x_i' = (x_i', y_i', w_i')^T$; in $$\begin{pmatrix} h^1 \\ h^2 \\ h^3 \end{pmatrix}, h^1 = [\, h_1 \ \ h_2 \ \ h_3 \,], h^2 = [\, h_4 \ \ h_5 \ \ h_6 \,],$$

$$h^3 = [\, h_7 \ \ h_8 \ \ h_9 \,].$$

The matrix on the left of the formula (11) seems to be 3×9, but the row rank thereof is only 2 (e.g., the first row of $x_i'$ times plus the second row of $y_i'$ times, which only differs from the third row in a factor $-w_i'$), and thus only the first two rows are used, that is, $$\begin{bmatrix} 0^T & -w'_i x_i^T & y'_i x_i^T \\ w'_i x_i^T & 0^T & -x'_i x_i^T \end{bmatrix} \begin{pmatrix} h^1 \\ h^2 \\ h^3 \end{pmatrix} = 0 \qquad (12)$$

The above formula (12) can be denoted as: $A_i h = 0$.

In this way, for the four pairs of corresponding points, 4 groups, i.e., a total of 8 equations can be obtained as the formula (12), and as Hs meeting the equation group only differ from each other in one factor, a nontrivial solution can be ensured by adding $\|h\|=1$ thereto.

When the number of the pairs of the corresponding points is greater than 4, an overdetermined equation can be obtained; to obtain the solution to the overdetermined equation, it is feasible to use $\|Ah\|/\|h\|$ as a cost function to seek for the H minimizing the value of the function, and the solution is actually the feature vector corresponding to the minimum feature value of $A^T A$.

The planar mapping relationship information between the imaging plane and the display plane is determined by using the solution, the display content is deform-display controlled on the display plane accordingly, and it is possible to obtain an image of the display content deformed less and even undeformed on the imaging plane; and while the planar mapping relationship information between the imaging plane and the display plane is determined by using the solution, it is possible to select a certain reference content displayed on the display plane for implementation, the reference content may comprise the display content per se, and/or, the reference content may comprise other display contents displayed on the display plane other than the display content, for example, background contents and the like displayed on the display plane other than the display content, which thus increasing flexibility of example embodiments of the solution.

Further optionally, before the acquiring a reference content of the display plane and mapping relationship information of multiple pairs of corresponding points between images of the reference content formed on the imaging plane, the method further comprises: acquiring multi-point position information of the image of the reference content formed on the imaging plane. After the display control apparatus acquires the mapping relationship information of multiple pairs of corresponding points between images formed on the imaging plane, it is possible to determine a reference content of the display plane and mapping relationship information of multiple pairs of corresponding points between images of the reference content formed on the imaging plane accordingly at the side of the display control apparatus. The display control apparatus acquires multi-point position information of the image of the reference content formed on the imaging plane in a very flexible manner, which is not limited in the embodiment of the present application.

Optionally, the acquiring multi-point position information of the image of the reference content formed on the imaging plane comprises: acquiring the image of the reference content formed on the imaging plane; and performing feature analysis on the image of the reference content formed on the imaging plane, to determine the multi-point position information of the image of the reference content formed on the imaging plane. The solution can acquire an image of the reference content formed on the imaging plane at the side of the display control apparatus and perform feature analysis on the image, for example, feature analysis is performed on some feature points of the image, to determine multi-point position information according to a result of the feature analysis on the feature points. Further optionally, the acquiring the image of the reference content formed on the imaging plane comprises: shooting the image of the reference content formed on the imaging plane; under some circumstances, the display control apparatus can directly shoot the image of the reference content formed on the imaging plane, and thus the image of the imaging device can be acquired without interacting with the imaging device. Alternatively, further optionally, the acquiring the image of the reference content formed on the imaging plane comprises: receiving the image of the reference content formed on the imaging plane from an imaging device comprising the imaging plane; the display control apparatus can receive the image of the reference content formed on the imaging plane through communication with the imaging device in the solution, which is simple and easy to implement.

Optionally, the acquiring multi-point position information of the image of the reference content formed on the imaging plane comprises: receiving the multi-point position information of the image of the reference content formed on the imaging plane from an imaging device comprising the imaging plane. The display control apparatus can receive the multi-point position information of the image of the reference content formed on the imaging plane through communication with the imaging device in the solution, which is simple and easy to implement.

In combination with any display control method according to the embodiment of the present application, optionally, the display control method may further comprise: determining a desired display area of the display content on the display plane. Correspondingly, the deform-displaying the display content on the display plane at least according to the planar mapping relationship information, to reduce a deformation degree of an image formed by the deformed display content on the imaging plane comprises: deform-displaying the display content on the display plane according to the desired display area and the planar mapping relationship information, to reduce the deformation degree of the image formed by the deformed display content on the imaging plane. The desired display area is configured to represent an area where there is greater probability that the display plane is shot by the lens, and is determined in a very flexible manner, which is not limited in the embodiment of the present application. During an actual application, the size of the desired display area does not completely match the size of at least part of the display content (the at least part of the display content is, for example, the whole of the display content or a key part of the display content and other parts); in this case, it is possible to adjust a deform-display control parameter, such as a scale, of at least part of the display content according to the desired display area and the planar mapping relationship information, to cause the size of the desired display area to meet the display demand of the at least part of the display content and the image of the display content obtained on the imaging plane to deform less.

An optional situation where adjustment is made in combination with the desired display area is as follows, for example, in response to that a current display area of the display content is greater than the desired display area, at least part of the display content is zoomed out according to the desired display area. Optionally, in response to that the size of the desired display area is less than that of the at least part of the display content, it is possible to, by combining the size of the desired display area with the size of the at least part of the display content, determine a zoom-out ratio of the at least part of the display content, adjust a display position of the display content on the display plane according to the desired display area, and zoom out the at least part of the display content according to the determined zoom-out ratio, to cause the size of the desired display area to meet the display demand of the at least part of the display content; in addition, determination of the zoom-out ratio can meet that the zoom-out degree is as small as possible in the case of meeting the display demand of the at least part of the display content, an ideal state is that the desired display area is filled with the at least part of the display content, and thus it is possible to display the at least part of the display content as large as possible in the case of meeting the display demand of the at least part of the display content, to increase the convenience at which the lens acquires the at least part of the display content and the imaging quality.

Another optional situation where adjustment is made in combination with the desired display area is as follows, for example, in response to that a current display area of the display content is less than the desired display area, at least part of the display content is zoomed in according to the desired display area. Optionally, in response to that the size of the desired display area is greater than that of the at least part of the display content, it is possible to, by combining the size of the desired display area with the size of the at least part of the display content, determine a zoom-in ratio of the at least part of the display content, adjust a display position of the display content on the display plane according to the desired display area, and zoom in the at least part of the display content according to the determined zoom-in ratio, to cause the size of the desired display area to meet the display demand of the at least part of the display content; in addition, determination of the zoom-out ratio can meet that the zoom-out degree is as small as possible in the case of meeting the display demand of the at least part of the display content, an ideal state is that the desired display area is filled with the at least part of the display content, and thus it is possible to display the at least part of the display content as large as possible in the case of meeting the display demand of the at least part of the display content, to increase the convenience at which the lens acquires the at least part of the display content and the imaging quality.

Figure 3:
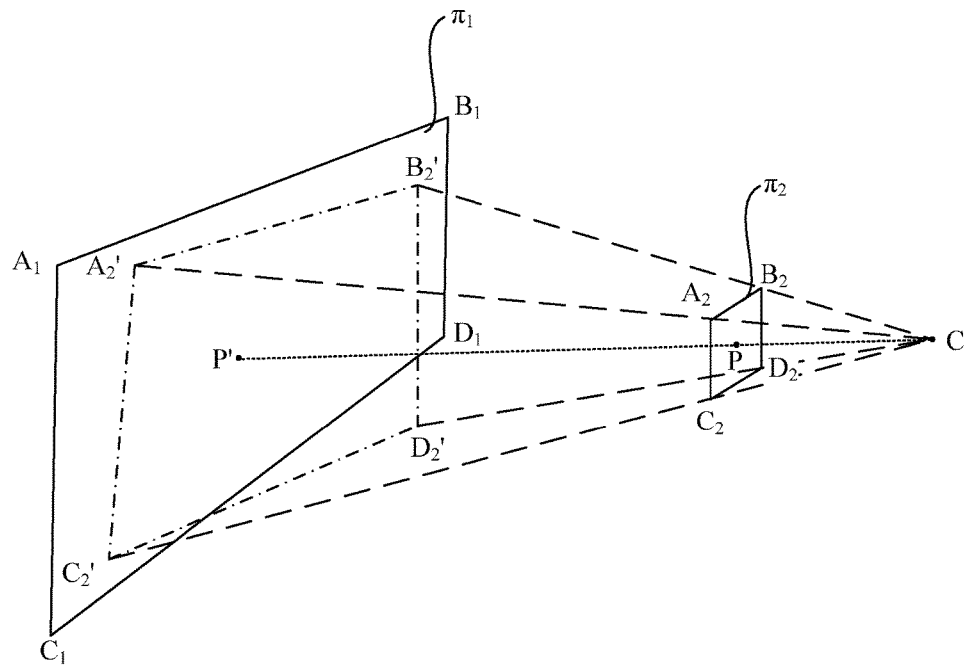
FIG. 3 illustrates a mapping relationship between an imaging plane and a display area of a display plane according to an example embodiment of the present application.

The desired display area is acquired in a very flexible manner, which is not limited in the embodiment of the present application; optionally, the determining a desired display area of the display content on the display plane comprises: determining an allowable imaging range of the imaging device comprising the imaging plane; and determining the desired display area according to the allowable imaging range and the display plane. An optional light path is as shown in FIG. 3, $\pi_1$ is a display plane, and $A_1B_1C_1D_1$ is a display range of $\pi_1$ on the display plane; $\pi_2$ is an imaging plane of a certain camera, and $A_2B_2C_2D_2$ is an optical sensor sensitivity range of the camera; C is an optical center of the lens, P is a principal point on the imaging plane $\pi_2$, an intersection point of P on the display plane $\pi_1$ along an optical axis CP of the lens is P', and projection $A_2'B_2'C_2'D_2'$ of the optical sensor sensitivity range $A_2B_2C_2D_2$ on the display plane $\pi_1$ is the allowable imaging range. According to different azimuth information of the lens relative to the display plane, the projection of the optical sensor sensitivity range $A_2B_2C_2D_2$ on the display plane $\pi_1$ is $A_2'B_2'C_2'D_2'$ (that is, allowable imaging range), which may be completely the same as or partially the same as the desired display area of the display content on the display plane, and in an actual application, an area where the projection $A_2'B_2'C_2'D_2'$ overlaps with the display range $A_1B_1C_1D_1$ of the display plane $\pi_1$ may be used as the desired display area of the display content on the display plane. The accuracy of determining the desired display area by using the solution is high.

In combination with any display control method according to the embodiment of the present application, before the deform-displaying the display content on the display plane, the display control method may further comprise a trigger mechanism of whether the display content is deform-display controlled, that is, determining whether the display position of the display content is deform-display controlled according to the trigger mechanism, thus meeting diversified actual application demands. Specific content of the trigger mechanism of whether the display content is deform-display controlled may be determined according to actual needs, which is not limited in the embodiment of the present application.

Optionally, before the deform-displaying the display content on the display plane, the method further comprises: receiving a shooting request for the display content. The imaging device may send a shooting request for the display content to the display control apparatus, and after receiving the shooting request, the display control apparatus may trigger deform-display controlling the display content. The solution uses receiving a shooting request for the display content as a trigger mechanism of deform-display controlling the display content, for example, only when a shooting request for the content sent out by the imaging device is received can the display control apparatus triggers deform-display controlling the display content, which can thus avoid possible interference with the user's use caused by adaptive deform-display control over the display content, equivalent to better matching between the deform-display control over the display content and the shooting demand of the imaging device, thereby improving pertinence of adaptive adjustment of the deform-display control and convenience of the user's use.

Optionally, before the display content is deform-display controlled, the display control method may further comprise: receiving a deform-display control request for the display content. The imaging device may send a deform-display control request for the display content to the display control apparatus, and after receiving the deform-display control request, the display control apparatus may trigger deform-display controlling the display content. The imaging device may determine according to actual needs whether it is necessary to send the deform-display control request for the display content to the display control apparatus, for example, the imaging device may send the deform-display control request to the display control apparatus when it is necessary to shoot the display content, or the imaging device may send the deform-display control request to the display control apparatus after attempting to shoot the display content due to poor shooting quality or other reasons, and so on. The solution uses receiving a deform-display control request for the display content as a trigger mechanism of deform-display controlling the display content, for example, only when a deform-display control request for the display content sent out by the imaging device is received can the display control apparatus triggers deform-display controlling the display content, which can thus avoid possible interference with the user's use caused by adaptive adjustment of deform-display of the display content, equivalent to better matching between the deform-display control of the display content and the shooting demand of the imaging device, thereby improving pertinence of adaptive adjustment of deform-display control and convenience of the user's use.

Optionally, before the display content is deform-display controlled, the display control method may further comprise: determining that the imaging device comprising the imaging plane is in a view range of the display plane. Light of the display plane can reach a range where the receiving end is imaged in a certain view range, which is the view range of the display plane, for example, a view range displayed by a certain display screen is the view range of the display plane in the case that a display range of the display screen is used as the display plane, and so on. The display control apparatus can detect whether the imaging device is within a view range of the display plane through a camera, a distance sensor or the like, and if a detection result indicates that the imaging device is in the display range, it indicates that the probability that the imaging device shoots the display content is greater, or the probability that the imaging device can shoot the display content is greater, or the success probability that the display content is actively pushed to the imaging device is greater, and so on; therefore, it is possible to trigger deform-display control of the display content. The solution uses that the display control apparatus determines that the imaging device is within a view range of the display plane as a trigger mechanism of deform-display controlling the display content, which thus helps to increase the flexibility of active pushing of the display content, increases the discovery probability of the display content, and can simplify a complicated operation required by the imaging device to shoot the display content to some extent.

It should be understood by those skilled in the art that, in any one of the foregoing methods of the example embodiments of the present application, the value of the serial number of each step described above does not mean an execution sequence, and the execution sequence of each step should be determined according to the function and internal logic thereof, and should not be any limitation to the example embodiments of the present application.

Figure 4:
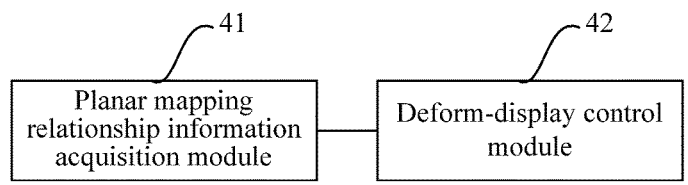
FIG. 4 is a logic block diagram of a first display control apparatus according to an example embodiment of the present application.

FIG. 4 is a logic block diagram of a first display control apparatus according to an embodiment of the present application. As shown in FIG. 4, a display control apparatus according to the embodiment of the present application comprises: a planar mapping relationship information acquisition module 41 and a deform-display control module 42.

The planar mapping relationship information acquisition module 41 is configured to acquire planar mapping relationship information between an imaging plane and a display plane.

The deform-display control module 42 is configured to deform-display the display content on the display plane at least according to the planar mapping relationship information, to reduce a deformation degree of an image formed by the deformed display content on the imaging plane.

In the technical solution provided in the embodiment of the present application, it is feasible to acquire planar mapping relationship information between an imaging plane and a display plane, and deform-display the display content on the display plane at least according to the planar mapping relationship information, to reduce a deformation degree of an image formed by the deformed display content on the imaging plane; such processing is equivalent to adaptively adjusting a display parameter such as a display shape of the display content on the display plane according to the planar mapping relationship information between the imaging plane and the display plane, to, in a manner similar to pre-deforming the display content on the display plane, partially cancel and even avoid the deformation degree of the image of the display content acquired on the imaging plane, causing the image of the display content acquired on the imaging plane to have little deformation and even no deformation, which reduces the requirement for alignment precision of an imaging device required by the imaging plane to acquire an image of the display content deformed less to some extent, simplifies and even avoids complicated operations such as aligning the imaging device of the display content and adjusting posture during shooting, and increases users' operational convenience; in addition, through pre-deformation of the display plane, the imaging device can make full use of pixel resources of the imaging plane to acquire more information of the display content by means of optical acquisition, for example, an image of the display content which has a relatively uniform signal to noise ratio and higher quality is obtained, thus helping to increase correctness and success rate at which the imaging device processes, which comprises, but is not limited to, decodes, synthesizes and transmits the image.

Device manifestations of the display control apparatus are not limited, for example, the display control apparatus may be a certain separate component, and the component cooperates with a display device with a display screen or a display device that can form a certain display plane in space for communications; or the display control apparatus may be integrated, as a certain functional module, into a display device with a display screen or a display device that can form a certain display plane in space; or the display control apparatus may be a display device, and so on.

Whether the display content is deformed may be relative to a certain reference shape of the display content. Optionally, it is feasible to use the shape of the display content as a reference before the display content is deform-display controlled on the display plane, if, relative to the reference shape, the display content changes wholly or partially in the shape, it is equivalent to deform-display control the display content, possible manifestations are as follows: for example, relative to the reference shape, the display content deform-displayed on the display plane is, but not limited to, at least partially drawn, at least partially flattened, at least partially zoomed out, at least partially tilted and/or at least partially distorted, which thus meets diversified application demands of reducing the deformation degree of the image of the display content acquired in the case that the imaging plane and the display plane are in multiple planar mapping relationships, and increases universality of the solution.

Figure 5:
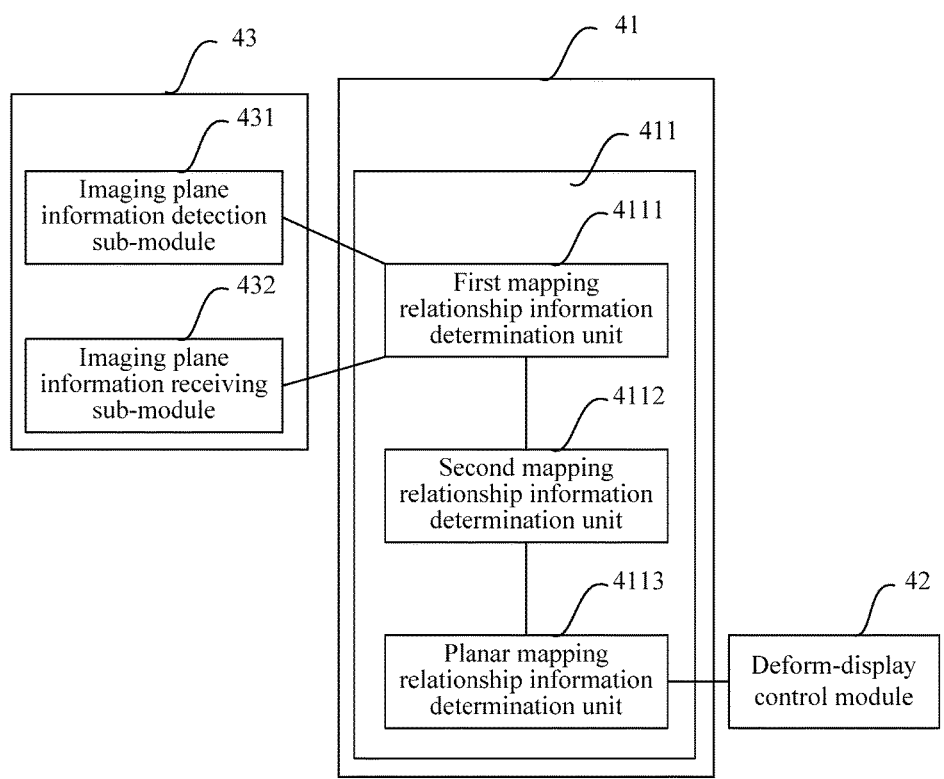
FIG. 5 is a logic block diagram of a second display control apparatus according to an example embodiment of the present application.

Optionally, as shown in FIG. 5, the planar mapping relationship information acquisition module 41 comprises: a first planar mapping relationship information acquisition sub-module 411. The first planar mapping relationship information acquisition sub-module 411 is configured to determine the planar mapping relationship information according to multi-point position information of the display plane, multi-point position information of the imaging plane and posture information of the imaging plane. The planar mapping relationship information between the imaging plane and the display plane is determined by using the solution, the display content is deform-display controlled on the display plane accordingly, and it is possible to obtain an image of the display content deformed less and even undeformed on the imaging plane.

Optionally, the display control apparatus further comprises: an imaging plane information acquisition module 43. The imaging plane information acquisition module 43 is configured to acquire the multi-point position information and the posture information of the imaging plane.

Optionally, the imaging plane information acquisition module 43 comprises: an imaging plane information detection sub-module 431. The imaging plane information detection sub-module 431 is configured to position and detect a posture of an imaging device comprising the imaging plane, to acquire the multi-point position information and the posture information of the imaging plane. The solution can, by positioning and actively detecting the posture of the imaging device through the display control apparatus, acquire the multi-point position information of the imaging plane and the posture information of the imaging plane, and during acquisition of the information, the display control apparatus can acquire the information in the case of having as little interaction as possible and even having no interaction with the imaging device.

Optionally, the imaging plane information acquisition module 43 comprises: an imaging plane information receiving sub-module 432. The imaging plane information receiving sub-module 432 is configured to receive the multi-point position information and the posture information of the imaging plane from an imaging device comprising the imaging plane. In the solution, the display control apparatus can acquire the multi-point position information of the imaging plane and the posture information of the imaging plane in a manner of receiving them from an imaging device.

Optionally, the first planar mapping relationship information acquisition sub-module 411 comprises: a first mapping relationship information determination unit 4111, a second mapping relationship information determination unit 4112 and a planar mapping relationship information determination unit 4113. The first mapping relationship information determination unit 4111 is configured to determine first mapping relationship information of multiple points of the display plane relative to a reference coordinate system respectively according to the multi-point position information of the display plane; the second mapping relationship information determination unit 4112 is configured to determine second mapping relationship information of multiple points of the display plane relative to the reference coordinate system respectively according to the multi-point position information and the posture information of the display plane; and the planar mapping relationship information determination unit 4113 is configured to determine the planar mapping relationship information according to the first mapping relationship information and the second mapping relationship information. Example embodiments of determining the planar mapping relationship information by using the solution is very flexible, for example, determination of the first mapping relationship information is related to multi-point position information of the display plane, determination of the second mapping relationship information is related to multi-point position information of the imaging plane and the posture of the imaging plane, and for different imaging planes, it is possible to multiplex the first mapping relationship information to determine planar mapping relationship information respectively corresponding to each imaging plane, thus reducing the calculation amount and implementation complexity of determining planar mapping relationship information between different imaging planes and the same display plane.

Figure 6:
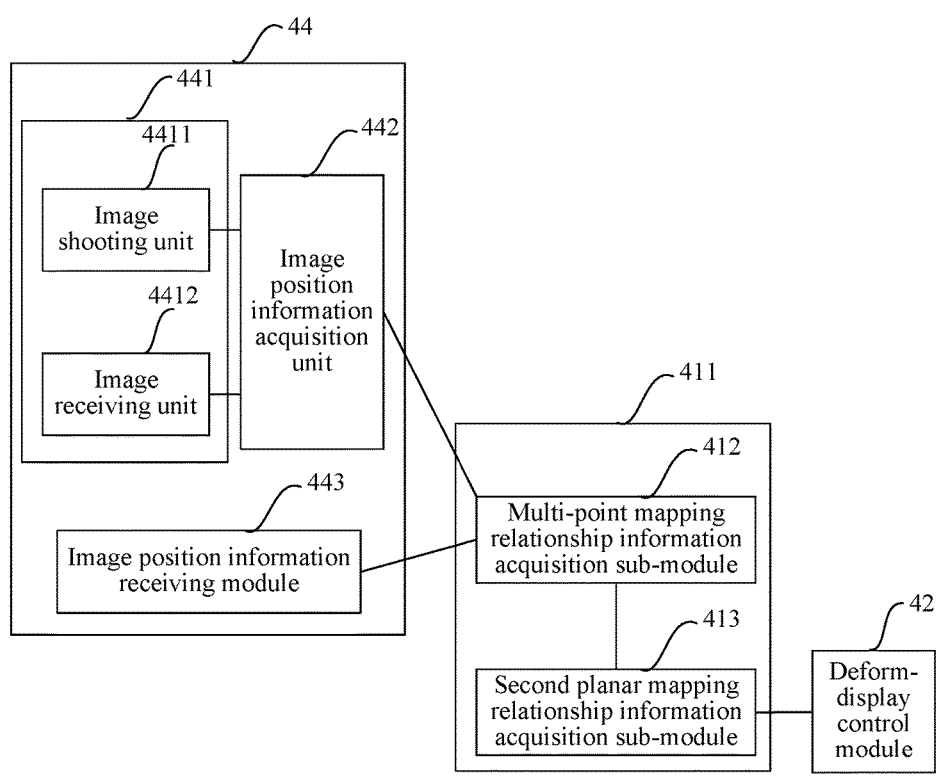
FIG. 6 is a logic block diagram of a third display control apparatus according to an example embodiment of the present application.

Optionally, as shown in FIG. 6, the planar mapping relationship information acquisition module 41 comprises: a multi-point mapping relationship information acquisition sub-module 412 and a second planar mapping relationship information acquisition sub-module 413. The multi-point mapping relationship information acquisition sub-module 412 is configured to acquire a reference content of the display plane and mapping relationship information of multiple pairs of corresponding points between images of the reference content formed on the imaging plane; and the second planar mapping relationship information acquisition sub-module 413 is configured to determine the planar mapping relationship information according to the mapping relationship information. The planar mapping relationship information between the imaging plane and the display plane is determined by using the solution, the display content is deform-display controlled on the display plane accordingly, and it is possible to obtain an image of the display content deformed less and even undeformed on the imaging plane; and while the planar mapping relationship information between the imaging plane and the display plane is determined by using the solution, it is possible to select a certain reference content displayed on the display plane for implementation, the reference content may comprise the display content per se, and/or, the reference content may comprise other display contents displayed on the display plane other than the display content, for example, background contents and the like displayed on the display plane other than the display content, which thus increasing flexibility of example embodiments.

Further optionally, before the acquiring a reference content of the display plane and mapping relationship information of multiple pairs of corresponding points between images of the reference content formed on the imaging plane, the method further comprises: acquiring multi-point position information of the image of the reference content formed on the imaging plane. After the display control apparatus acquires the mapping relationship information of multiple pairs of corresponding points between images formed on the imaging plane, it is possible to determine a reference content of the display plane and mapping relationship information of multiple pairs of corresponding points between images of the reference content formed on the imaging plane accordingly at the side of the display control apparatus. The display control apparatus acquires multi-point position information of the image of the reference content formed on the imaging plane in a very flexible manner, which is not limited in the embodiment of the present application.

Optionally, the display control apparatus further comprises: an image position information acquisition module 44. The image position information acquisition module 44 is configured to acquire multi-point position information of the image of the reference content formed on the imaging plane. After the display control apparatus acquires the mapping relationship information of multiple pairs of corresponding points between images formed on the imaging plane, it is possible to determine a reference content of the display plane and mapping relationship information of multiple pairs of corresponding points between images of the reference content formed on the imaging plane accordingly at the side of the display control apparatus.

Optionally, the image position information acquisition module 44 comprises: an image acquisition sub-module 441 and an image position information acquisition unit 442. The image acquisition sub-module 441 is configured to acquire the image of the reference content formed on the imaging plane; and the image position information acquisition unit 442 is configured to perform feature analysis on the image of the reference content formed on the imaging plane, to determine the multi-point position information of the image of the reference content formed on the imaging plane. The solution can acquire an image of the reference content formed on the imaging plane at the side of the display control apparatus and perform feature analysis on the image, for example, feature analysis is performed on some feature points of the image, to determine multi-point position information according to a result of the feature analysis on the feature points.

Optionally, the image acquisition sub-module 441 comprises: an image shooting unit 4411. The image shooting unit 4411 is configured to shoot the image of the reference content formed on the imaging plane. Under some circumstances, the display control apparatus can directly shoot the image of the reference content formed on the imaging plane, and thus the image of the imaging device can be acquired without interacting with the imaging device.

Optionally, the image acquisition sub-module 441 comprises: an image receiving unit 4412. The image receiving unit 4412 is configured to receive the image of the reference content formed on the imaging plane from an imaging device comprising the imaging plane. The display control apparatus can receive the image of the reference content formed on the imaging plane through communication with the imaging device in the solution, which is simple and easy to implement.

Optionally, the image position information acquisition module 44 comprises: an image position information receiving module 443. The image position information receiving module 443 is configured to receive the multi-point position information of the image of the reference content formed on the imaging plane from an imaging device comprising the imaging plane. The display control apparatus can receive the multi-point position information of the image of the reference content formed on the imaging plane through communication with the imaging device in the solution, which is simple and easy to implement.

Figure 7:
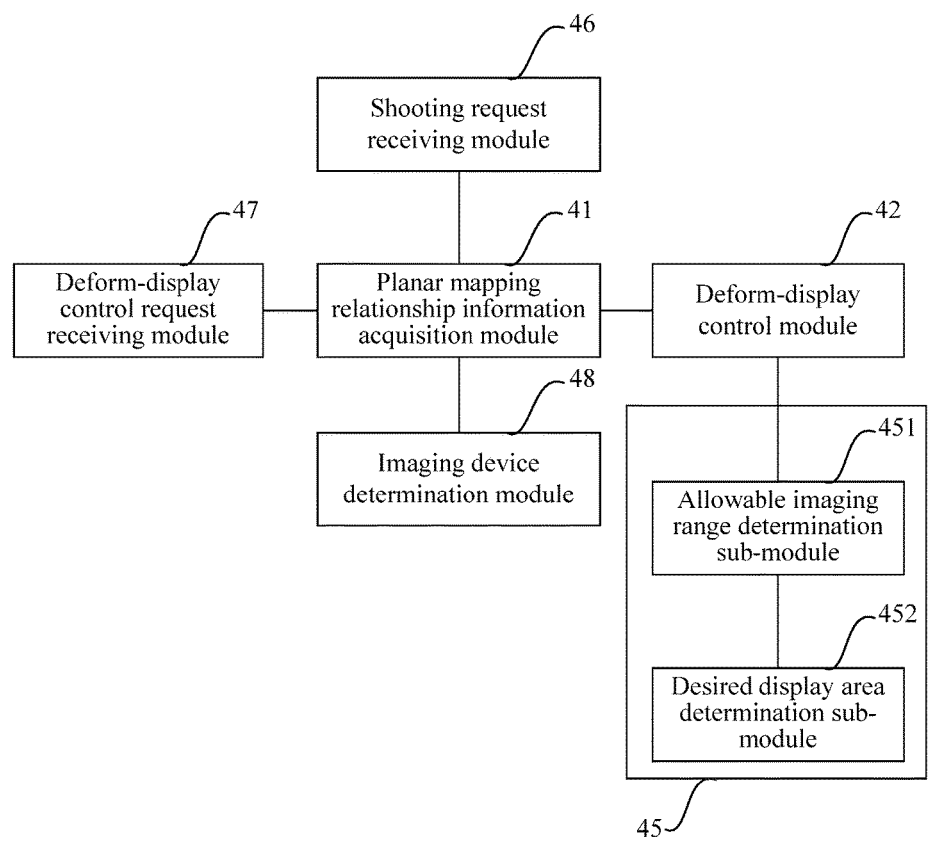
FIG. 7 is a logic block diagram of a fourth display control apparatus according to an example embodiment of the present application.

In combination with any display control apparatus according to the embodiment of the present application, optionally, as shown in FIG. 7, the display control apparatus may further comprise: a desired display area determination module 45, configured to determine a desired display area of the display content on the display plane; and the deform-display control module 42 comprises: a deform-display control sub-module 421, configured to deform-display the display content on the display plane according to the desired display area and the planar mapping relationship information, to reduce the deformation degree of the image formed by the deformed display content on the imaging plane. In this case, it is possible to adjust a deform-display control parameter, such as a scale, of at least part of the display content according to the desired display area and the planar mapping relationship information, to cause the size of the desired display area to meet the display demand of the at least part of the display content and the image of the display content obtained on the imaging plane to deform less.

Optionally, the desired display area determination module 45 comprises: an allowable imaging range determination sub-module 451 and a desired display area determination sub-module 452. The allowable imaging range determination sub-module 451 is configured to determine an allowable imaging range of the imaging device comprising the imaging plane; and the desired display area determination sub-module 452 is configured to determine the desired display area according to the allowable imaging range and the display plane. The accuracy of determining the desired display area by using the solution is high.

In combination with any display control apparatus according to the embodiment of the present application, optionally, the display control apparatus may further comprise: a shooting request receiving module 46. The shooting request receiving module 46 is configured to receive a shooting request for the display content, and enable the planar mapping relationship information acquisition module or the deform-display control module according to a receiving result. The solution uses receiving a shooting request for the display content as a trigger mechanism of deform-display controlling the display content, for example, only when a shooting request for the content sent out by the imaging device is received can the display control apparatus triggers deform-display controlling the display content, which can thus avoid possible interference with the user's use caused by adaptive deform-display control over the display content, equivalent to better matching between the deform-display control over the display content and the shooting demand of the imaging device, thereby improving pertinence of adaptive adjustment of the deform-display control and convenience of the user's use.

In combination with any display control apparatus according to the embodiment of the present application, optionally, the display control apparatus may further comprise: a deform-display control request receiving module 47. The deform-display control request receiving module 47 is configured to receive a deform-display control request for the display content, and enable the planar mapping relationship information acquisition module or the deform-display control module according to a receiving result. The solution uses receiving a deform-display control request for the display content as a trigger mechanism of deform-display controlling the display content, for example, only when a deform-display control request for the display content sent out by the imaging device is received can the display control apparatus triggers deform-display controlling the display content, which can thus avoid possible interference with the user's use caused by adaptive adjustment of deform-display of the display content, equivalent to better matching between the deform-display control of the display content and the shooting demand of the imaging device, thereby improving pertinence of adaptive adjustment of deform-display control and convenience of the user's use.

In combination with any display control apparatus according to the embodiment of the present application, optionally, the display control apparatus may further comprise: an imaging device determination module 48, configured to determine that the imaging device comprising the imaging plane is in a view range of the display plane, and enable the planar mapping relationship information acquisition module or the deform-display control module according to a receiving result. The solution uses that the display control apparatus determines that the imaging device is within a view range of the display plane as a trigger mechanism of deform-display controlling the display content, which thus helps to increase the flexibility of active pushing of the display content, increases the discovery probability of the display content, and can simplify a complicated operation required by the imaging device to shoot the display content to some extent.

Figure 8:
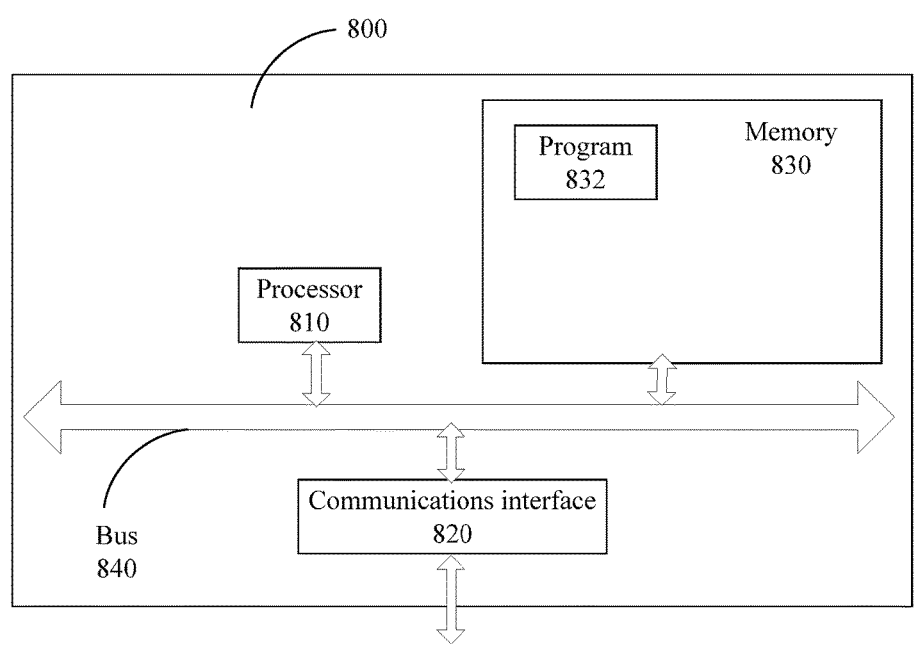
FIG. 8 is a logic block diagram of a fifth display control apparatus according to an example embodiment of the present application.

FIG. 8 is a logic block diagram of a fifth display control apparatus according to an embodiment of the present application; the specific embodiment of the present application does not limit an example embodiment of the display control apparatus 800. As shown in FIG. 8, the display control apparatus 800 may comprise:

a processor 810, a communications interface 820, a memory 830, and a communications bus 840.

The processor 810, the communications interface 820, and the memory 830 communicate with each other via the communications bus 840.

The communications interface 820 is configured to communicate with, for example, a device having a communications function, an external light source or the like.

The processor 810 is configured to run a program 832, and specifically can perform the related steps in any one of the foregoing embodiments of the display control method.

For example, the program 832 may comprise program code, where the program code comprises a computer operating instruction.

The processor 810 may be a central processing unit (CPU), or an application specific integrated circuit (ASIC), or one or more integrated circuits configured to implement the embodiments of the present application.

The memory 830 is configured to store the program 832. The memory 830 may comprise a random access memory (RAM), or further comprise a non-volatile memory, for example, at least one magnetic disk memory.

For example, in an example embodiment, the processor 810 may run the program 832 to perform the following steps: acquiring planar mapping relationship information between an imaging plane and a display plane; and deform-displaying the display content on the display plane at least according to the planar mapping relationship information, to reduce a deformation degree of an image formed by the deformed display content on the imaging plane.

In other example embodiments, the processor 810 may also run the program 832 to perform the steps mentioned above in any one of the other embodiments, and details are not described herein again.

For the steps in the program 832, reference may be made to the corresponding descriptions in the corresponding steps, modules, sub-modules and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, which are not described herein again.

In the various embodiments of the present application, the serial numbers and/or sequence numbers of the embodiments are merely for the convenience of description, and do not imply the preference among the embodiments. Particular emphasis is put on the description about each embodiment, and reference can be made to relevant description of other embodiments for the content not detailed in an embodiment. Reference can be made to the description about the corresponding method embodiments for related description about the implementation principle or process of relevant apparatus, device or system embodiments, which is not repeated herein.

A person of ordinary skill in the art may be aware that, units and method steps of the examples that are described in conjunction with the embodiments disclosed in this specification may be implemented by electronic hardware or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a controller, a network device, or the like) to perform all or some of the steps of the methods described in the embodiments of the present application. The foregoing storage medium comprises: any medium that can store program code, such as a USB flash drive, a removable hard disk, a read-only memory (ROM), a random access memory (RAM), a magnetic disk, or an optical disc.

In the embodiments of the apparatus, method, and system of the present application, apparently, the parts (a system, a subsystem, a module, a sub-module, a unit, a subunit, and the like) or steps may be decomposed or combined, and/or decomposed first and then combined. These decomposition and/or combination should be considered as equivalent solutions of the present application. In the above descriptions of the specific embodiments of the present application, a feature described and/or shown for one example embodiment may be used in one or more of other example embodiments in the same or similar manner and combined with a feature in another example embodiment, or replace a feature in another example embodiment.

It should be emphasized that, terms "comprise/include" used herein refer to existence of a feature, an element, a step, or a component, but do not exclude existence or addition of one or more of other features, elements, steps, or components.

Finally, it should be noted that the foregoing example embodiments are merely used to describe the present application, but are not intended to limit the present application. A person of ordinary skill in the art may further make various variations and modifications without departing from the spirit and scope of the present application. Therefore, all the equivalent technical solutions also fall within the scope of the present application, and the patent protection scope of the present application should be defined by the claims.

What is claimed is:

1. A method, comprising:
acquiring, by a system comprising a processor, planar mapping relationship information between an imaging plane and a display plane, wherein the acquiring the planar mapping relationship information between the imaging plane and the display plane comprises:
determining the planar mapping relationship information according to multi-point position information of the display plane, multi-point position information of the imaging plane, and posture information of the imaging plane, wherein the determining the planar mapping relationship information according to the multi-point position information of the display plane, the multi-point position information of the imaging plane, and the posture information of the imaging plane comprises:
determining first mapping relationship information of multiple first points of the display plane relative to a reference coordinate system respectively according to the multi-point position information of the display plane;
determining second mapping relationship information of multiple second points of the imaging plane relative to the reference coordinate system respectively according to the multi-point position information of the imaging plane and the posture information of the imaging plane; and determining the planar mapping relationship information according to the first mapping relationship information and the second mapping relationship information; and deform-displaying display content on the display plane at least according to the planar mapping relationship information resulting in deformed display content, wherein the deform-displaying reduces a deformation degree of an image formed by the deformed display content on the imaging plane.

2. The method of claim 1, further comprising:

before the determining the planar mapping relationship information, acquiring the multi-point position information of the imaging plane and the posture information of the imaging plane.

3. The method of claim 2, wherein the acquiring the multi-point position information of the imaging plane and the posture information of the imaging plane comprises:

positioning and detecting a posture of an imaging device comprising the imaging plane, to acquire the multi-point position information of the imaging plane and the posture information of the imaging plane.

4. The method of claim 2, wherein the acquiring the multi-point position information of the imaging plane and the posture information of the imaging plane comprises:

receiving the multi-point position information of the imaging plane and the posture information of the imaging plane from an imaging device comprising the imaging plane.

5. The method of claim 1, wherein the acquiring the planar mapping relationship information between the imaging plane and the display plane comprises:

acquiring a reference content of the display plane and multi-point mapping relationship information of multiple pairs of corresponding points between images of the reference content formed on the imaging plane; and determining the planar mapping relationship information according to the multi-point mapping relationship information.

6. The method of claim 5, wherein the reference content comprises: the display content, or other display content displayed on the display plane other than the display content.

7. The method of claim 5, further comprising:

before the acquiring the reference content of the display plane and the multi-point mapping relationship information of the multiple pairs of the corresponding points between the images of the reference content formed on the imaging plane, acquiring multi-point position information of an image of the images of the reference content formed on the imaging plane.

8. The method of claim 7, wherein the acquiring the multi-point position information of the image of the images of the reference content formed on the imaging plane comprises:

acquiring the image of the images of the reference content formed on the imaging plane; and performing feature analysis on the image of the images of the reference content formed on the imaging plane, to determine the multi-point position information of the image of the images of the reference content formed on the imaging plane.

9. The method of claim 8, wherein the acquiring the image of the images of the reference content formed on the imaging plane comprises:

shooting the image of the images of the reference content formed on the imaging plane.

10. The method of claim 8, wherein the acquiring the image of the images of the reference content formed on the imaging plane comprises:

receiving the image of the images of the reference content formed on the imaging plane from an imaging device comprising the imaging plane.

11. The method of claim 7, wherein the acquiring the multi-point position information of the image of the images of the reference content formed on the imaging plane comprises:

receiving the multi-point position information of the image of the images of the reference content formed on the imaging plane from an imaging device comprising the imaging plane.

12. The method of claim 1, further comprising:

determining a desired display area of the display content on the display plane, and wherein the deform-displaying the display content on the display plane at least according to the planar mapping relationship information, to reduce the deformation degree of the image formed by the deformed display content on the imaging plane comprises: deform-displaying the display content on the display plane according to the desired display area and the planar mapping relationship information, to reduce the deformation degree of the image formed by the deformed display content on the imaging plane.

13. The method of claim 12, wherein the determining the desired display area of the display content on the display plane comprises:

determining an allowable imaging range of an imaging device comprising the imaging plane; and determining the desired display area according to the allowable imaging range and the display plane.

14. The method of claim 1, wherein the deformed display content on the display plane is at least one of at least partially drawn, at least partially flattened, at least partially zoomed out, at least partially tilted or at least partially distorted.

15. The method of claim 1, further comprising:

before the deform-displaying the display content on the display plane, receiving a shooting request for the display content.

16. The method of claim 1, further comprising:

before the deform-displaying the display content on the display plane, receiving a deform-display control request for the display content.

17. The method of claim 1, further comprising:

before the deform-displaying the display content on the display plane, determining that an imaging device comprising the imaging plane is in a view range of the display plane.

18. An apparatus, comprising:

a memory that stores executable modules; and a processor, coupled to the memory, that executes or facilitates execution of the executable modules, the executable modules comprising:

a planar mapping relationship information acquisition module configured to acquire planar mapping relationship information between an imaging plane and a display plane, wherein the planar mapping relationship information acquisition module comprises:

a first planar mapping relationship information acquisition sub-module configured to determine the planar mapping relationship information according to multi-point position information of the display plane, multi-point position information of the imaging plane and posture information of the imaging plane, wherein the first planar mapping relationship information acquisition sub-module comprises:
- a first mapping relationship information determination unit configured to determine first mapping relationship information of multiple first points of the display plane relative to a reference coordinate system respectively according to the multi-point position information of the display plane;
- a second mapping relationship information determination unit configured to determine second mapping relationship information of multiple second points of the imaging plane relative to the reference coordinate system respectively according to the multi-point position information of the imaging plane and the posture information of the imaging plane; and
- a planar mapping relationship information determination unit configured to determine the planar mapping relationship information according to the first mapping relationship information and the second mapping relationship information; and a deform-display control module configured to deform-display display content on the display plane at least according to the planar mapping relationship information yielding deformed display content, to reduce a deformation degree of an image formed by the deformed display content on the imaging plane.

19. The apparatus of claim 18, wherein the executable modules further comprise:
an imaging plane information acquisition module configured to acquire the multi-point position information of the imaging plane and the posture information of the imaging plane.

20. The apparatus of claim 19, wherein the imaging plane information acquisition module comprises:
an imaging plane information detection sub-module configured to position and detect a posture of an imaging device comprising the imaging plane, to acquire the multi-point position information of the imaging plane and the posture information of the imaging plane.

21. The apparatus of claim 19, wherein the imaging plane information acquisition module comprises:
an imaging plane information receiving sub-module configured to receive the multi-point position information of the imaging plane and the posture information of the imaging plane from an imaging device comprising the imaging plane.

22. The apparatus of claim 18, wherein the planar mapping relationship information acquisition module comprises:
- a multi-point mapping relationship information acquisition sub-module configured to acquire a reference content of the display plane and multi-point mapping relationship information of multiple pairs of corresponding points between images of the reference content formed on the imaging plane; and
- a second planar mapping relationship information acquisition sub-module configured to determine the planar mapping relationship information according to the multi-point mapping relationship information.

23. The apparatus of claim 22, wherein the reference content comprises: the display content, or other display contents displayed on the display plane other than the display content.

24. The apparatus of claim 22, wherein the executable modules further comprise:
an image position information acquisition module configured to acquire multi-point position information of an image of the images of the reference content formed on the imaging plane.

25. The apparatus of claim 24, wherein the image position information acquisition module comprises:
- an image acquisition sub-module configured to acquire the image of the images of the reference content formed on the imaging plane; and
- an image position information acquisition unit configured to perform feature analysis on the image of the images of the reference content formed on the imaging plane, to determine the multi-point position information of the image of the images of the reference content formed on the imaging plane.

26. The apparatus of claim 25, wherein the image acquisition sub-module comprises:
an image shooting unit configured to shoot the image of the images of the reference content formed on the imaging plane.

27. The apparatus of claim 25, wherein the image acquisition sub-module comprises:
an image receiving unit configured to receive the image of the images of the reference content formed on the imaging plane from an imaging device comprising the imaging plane.

28. The apparatus of claim 24, wherein the image position information acquisition module comprises:
an image position information receiving module configured to receive the multi-point position information of the image of the images of the reference content formed on the imaging plane from an imaging device comprising the imaging plane.

29. The apparatus of claim 18, wherein the executable modules further comprise:
a desired display area determination module configured to determine a desired display area of the display content on the display plane, and
wherein the deform-display control module comprises:
a deform-display control sub-module configured to deform-display the display content on the display plane according to the desired display area and the planar mapping relationship information, to reduce the deformation degree of the image formed by the deformed display content on the imaging plane.

30. The apparatus of claim 18, wherein the desired display area determination module comprises:
- an allowable imaging range determination sub-module configured to determine an allowable imaging range of an imaging device comprising the imaging plane; and
- a desired display area determination sub-module configured to determine the desired display area according to the allowable imaging range and the display plane.

31. The apparatus of claim 18, wherein the deformed display content on the display plane is at least one of at least partially drawn, at least partially flattened, at least partially zoomed out, at least partially tilted or at least partially distorted.

32. The apparatus of claim 18, wherein the executable modules further comprise:

a shooting request receiving module configured to receive a shooting request for the display content, and enable the planar mapping relationship information acquisition module or the deform-display control module according to a received result from the shooting request.

33. The apparatus of claim 18, wherein the executable modules further comprise:
a deform-display control request receiving module configured to receive a deform-display control request for the display content, and enable the planar mapping relationship information acquisition module or the deform-display control module according to a received result from the deform-display control request.

34. The apparatus of claim 18, wherein the executable modules further comprise:
an imaging device determination module configured to determine that an imaging device comprising the imaging plane is in a view range of the display plane, and enable the planar mapping relationship information acquisition module or the deform-display control module according to a received result.

35. An apparatus, comprising:
a processor, a communication interface, a memory and a communication bus, wherein the processor, the communication interface and the memory accomplish mutual communication through the communication bus, wherein the memory is configured to store at least one instruction, wherein the at least one instruction causing the processor to perform operations, comprising:
acquiring planar mapping relationship information between an imaging plane and a display plane, wherein the acquiring the planar mapping relationship information between the imaging plane and the display plane comprises:
  determining the planar mapping relationship information according to multi-point position information of the display plane, multi-point position information of the imaging plane and posture information of the imaging plane, wherein the determining the planar mapping relationship information according to the multi-point position information of the display plane, the multi-point position information of the imaging plane and the posture information of the imaging plane comprises:
    determining first mapping relationship information of multiple first points of the display plane relative to a reference coordinate system respectively according to the multi-point position information of the display plane;
    determining second mapping relationship information of multiple second points of the imaging plane relative to the reference coordinate system respectively according to the multi-point position information of the imaging plane and the posture information of the imaging plane; and
    determining the planar mapping relationship information according to the first mapping relationship information and the second mapping relationship information; and
deform-displaying display content on the display plane at least according to the planar mapping relationship information, to reduce a deformation degree of an image formed by the display content as deformed on the imaging plane.

36. The apparatus of claim 35, wherein the operations further comprise:
acquiring the multi-point position information of the imaging plane and the posture information of the imaging plane.

37. The apparatus of claim 36, wherein the acquiring the multi-point position information of the imaging plane and the posture information of the imaging plane comprises:
positioning and detecting a posture of an imaging device comprising the imaging plane, to acquire the multi-point position information of the imaging plane and the posture information of the imaging plane.

38. The apparatus of claim 36, wherein the acquiring the multi-point position information of the imaging plane and the posture information of the imaging plane comprises:
receiving the multi-point position information of the imaging plane and the posture information of the imaging plane from an imaging device comprising the imaging plane.

39. The apparatus of claim 35, wherein the acquiring the planar mapping relationship information between the imaging plane and the display plane comprises:
acquiring a reference content of the display plane and multi-point mapping relationship information of multiple pairs of corresponding points between images of the reference content formed on the imaging plane; and
determining the planar mapping relationship information according to the multi-point mapping relationship information.

* * * * *